(12) United States Patent
Kim

(10) Patent No.: US 9,870,079 B2
(45) Date of Patent: Jan. 16, 2018

(54) TOUCH SCREEN DISPLAY UNIT AND METHOD FOR MANUFACTURING SAME

(71) Applicants: DUKSAN SG CO., LTD, Siheung (KR); Jiwoong Kim, Bucheon (KR)

(72) Inventor: Jiwoong Kim, Bucheon (KR)

(73) Assignees: DUKSAN SG CO., LTD., Siheung (KR); Jiwoong Kim, Bucheon (KR)

( * ) Notice: Subject to any disclaimer, the term of this patent is extended or adjusted under 35 U.S.C. 154(b) by 0 days.

(21) Appl. No.: 14/899,634

(22) PCT Filed: Mar. 20, 2014

(86) PCT No.: PCT/KR2014/002376
§ 371 (c)(1),
(2) Date: Dec. 18, 2015

(87) PCT Pub. No.: WO2014/204083
PCT Pub. Date: Dec. 24, 2014

(65) Prior Publication Data
US 2016/0139696 A1  May 19, 2016

(30) Foreign Application Priority Data
Jun. 21, 2013 (KR) .......... 10-2013-0071607

(51) Int. Cl.
G06F 3/041 (2006.01)
(52) U.S. Cl.
CPC .... *G06F 3/041* (2013.01); *G06F 2203/04103* (2013.01); *G06F 2203/04112* (2013.01)

(58) Field of Classification Search
CPC .......... G06F 3/041; G06F 2203/04112; G06F 2203/04103
See application file for complete search history.

(56) References Cited

U.S. PATENT DOCUMENTS

2012/0146921 A1* 6/2012 Park .................. G06F 3/044
345/173

FOREIGN PATENT DOCUMENTS

| JP | 2011526023 A | 9/2011 |
| KR | 1020100031301 A | 3/2010 |
| KR | 100951136 B1 | 4/2010 |
| KR | 1020100051142 A | 5/2010 |
| KR | 101223570 B1 | 2/2013 |

OTHER PUBLICATIONS

International Search for PCT/KR2014/002376 dated May 29, 2014.

* cited by examiner

Primary Examiner — Charles Hicks
(74) Attorney, Agent, or Firm — STIP Law Group, LLC

(57) ABSTRACT

A touch screen display unit according to the present invention comprises: an adhesive layer having adhesive properties on both surfaces thereof; a decoration layer displaying, on one surface of the adhesive layer, one or more among letters, designs, patterns and a metallic texture; and a window attached on the other surface of the adhesive layer so as to allow the decoration layer to be seen therethrough and to form an outer appearance of the display unit.

10 Claims, 5 Drawing Sheets

TOUCH SCREEN DISPLAY UNIT AND METHOD FOR MANUFACTURING SAME

CROSS-REFERENCE TO RELATED APPLICATIONS

This application is the U.S. National Phase under 35 U.S.C. §371 of International Application No. PCT/KR2014/002376 filed on Mar. 20, 2014, which in turn claims the benefit of Korean Application No. 10-2013-0071607, filed on Jun. 21, 2013, the disclosures of which are incorporated by reference into the present application.

TECHNICAL FIELD

The present invention relates to a touch screen display unit and a method for manufacturing the same. More specifically, the present invention relates to a touch screen display unit including a decoration layer displaying, on one surface of the adhesive layer, letters, designs, patterns, a metallic texture, etc., and a window attached on the other surface so as to remarkably reduce the thickness, and a method for manufacturing the same.

The present invention has an advantage of preventing in advance defects such as stabs, etc. that may occur during the manufacturing process by forming a display window by completely drilling a part of the adhesive layer and decoration layer attached on the window.

The present invention relates to a touch screen display unit applicable to a window having a three-dimensional shape whose shape may be changed easily, and a method for manufacturing the same.

BACKGROUND ART

A portable terminal means communication equipment capable of exchanging calls and data while moving. Recently, portable terminals implement various useful functions in line with the era of digital convergence.

For example, the user may use audio on demand (AOD) service and video on demand (VOD) service using the portable terminal, or make video phone calls where the person making the call and the person receiving the call can see each other's face while making the phone call, or download games and play them. That is, the portable terminal is not used restrictively in the field of voice communication equipment any longer.

As the portable terminal is implementing more functions, users feel a need to control the portable terminal more quickly and conveniently. Accordingly, portable terminal manufacturers are providing a display unit implementing a touch screen function (hereinafter, "touch screen display unit") to the users.

Meanwhile, the touch screen panel used in the portable terminal may be a capacitive overlay type, resistive overlay type, surface acoustic wave type, transmitter type, infrared beam type, etc. Among the various types of touch screen panels, the capacitive overlay type is mainly used in portable terminals.

As can be seen in FIG. 1, the touch screen panel of the capacitive overlay type includes a window 1 made of PET, which is a dielectric or an insulator, an icon unit 3 covering a silver paste electrode 2 combined later by being coated at a lower edge of the window 1 and printed with a logo, etc., a PC sheet or glass 5 combined with the window 1 with double-sided tape 4, a dielectric film 6 made of a PET material combined in a lower surface of the glass 5 with double-sided tape 4, an ITO coating layer 7 deposited on a part sensing touch at an upper part of the dielectric film 6 with a transparent conductive material such as ITO, etc., a silver paste electrode 2 combined with an edge of the ITO coating layer 7 to deliver an electric signal to a control unit, and an LCD 9 attached on a lower surface of the dielectric film 6 with double-sided tape 8.

However, since the conventional touch screen panel of the capacitive overlay type uses three double-sided tapes (OCA tape: 4, 8) during the depositing process, there are disadvantages that a lot of defects occur because of the foreign substances and gas bubbles generated during the process of attaching double-sided tape when manufacturing a patch display unit with the current process. Also, the defect rate of the process is high due to the contraction of the double-sided tape and lump of the adhesive.

Accordingly, as shown in FIG. 2, Korean Patent Laid-Open No. 10-2010-0065486 discloses a touch screen panel structure of a capacitive overlay type, which improves the strength of the display unit by using a window and coating a CNT material by a screen method, and reducing defect rate by reducing the process of attaching double-sided tape.

That is, the touch panel includes a high strength plate 18 made of a high strength material such as acryl or window, etc., a UV coating layer 22, an icon unit 20, a CNT coating layer 16, a silver paste electrode 14, a ground electrode 24, and an LCD 10.

However, since the touch panel configured as above includes a plurality of layers, defects occur frequently during the manufacturing process, and there is difficulty in satisfying the consumer's desire to reduce the thickness of the portable terminal.

DETAILED DESCRIPTION OF INVENTION

Technical Subject Matter

It is an object of the present invention to solve the above problem of conventional art. More specifically, it is an object of the present invention to provide a touch screen display unit including a decoration layer displaying, on one surface of the adhesive layer, letters, designs, patterns, a metallic texture, etc., and a window attached on the other surface so as to remarkably reduce the thickness, and a method for manufacturing the same.

It is another object of the present invention to provide a touch screen display unit that may be attached even on a curved window because an adhesive member may be directly attached on the window without including a PET film that is thick while having strength, and a method for manufacturing the same.

Means for Solving Subject Matter

In order to achieve the above object, the touch screen display unit according to the present invention is characterized by including an adhesive layer having adhesive properties on both surfaces thereof; a decoration layer displaying, on one surface of the adhesive layer, one or more among letters, designs, patterns and a metallic texture; and a window attached on the other surface of the adhesive layer so as to allow the decoration layer to be seen therethrough and to form an outer appearance of the display unit.

The touch screen display unit is characterized in that a part of the decoration layer and the adhesive layer are drilled to form a display window.

The touch screen display unit is characterized in that the adhesive layer is transparent.

The touch screen display unit is characterized in that the decoration layer includes a plurality of layers.

The method for manufacturing a touch screen display unit is characterized by including a decoration forming step of forming a decoration layer displaying, on a release layer provided on a film, one or more among letters, designs, patterns and a metallic texture; a carrier attaching step of attaching a carrier having adhesiveness on an outer surface of the decoration layer; a decoration transferring step of transferring the decoration layer to be attached on a carrier by separating the release layer and the decoration layer; an adhesive layer providing step of adhering an adhesive layer provided with the decoration layer and a protective film; a processing step of processing the carrier, decoration layer, adhesive layer and protective film simultaneously; and a completing step of completing the touch screen display unit by removing the protective film to attach the adhesive layer on the window and removing the carrier.

The method is characterized in that the completing step includes a window attaching step of attaching the adhesive layer and window by removing the protective film; and a carrier removing step of removing a carrier from the decoration layer.

The method is characterized in that the adhesive layer has greater adhesiveness than a carrier.

The method is characterized in that the carrier has adhesiveness only on a first surface.

The method is characterized in that the decoration forming step is a process forming a plurality of decorations on one surface of the release layer.

The method is characterized in that a display window is formed by drilling the part of the carrier, decoration layer, adhesive layer and protective film simultaneously during the processing step.

Effect of Invention

The present invention includes a decoration layer displaying, on one surface of the adhesive layer, letters, designs, patterns, a metallic texture, etc., and a window attached on the other surface to complete a display unit.

Thus, the present invention has an advantage that the thickness of the display unit may be remarkably reduced.

Also, the present invention has an advantage of preventing in advance defects such as stabs, etc. that may occur during the manufacturing process by forming a display window by completely drilling part of the adhesive layer and decoration layer attached on the window.

In addition, the present invention has an advantage that it may be attached even on a curved window because an adhesive member is directly attached on the window without including a PET film that is thick while having strength.

BEST MODE FOR CARRYING OUT THE INVENTION

Hereinafter, referring to FIGS. 3 and 4, the constitution of the touch screen display unit (hereinafter, "display unit 100") according to the present invention is explained.

Figure 1:
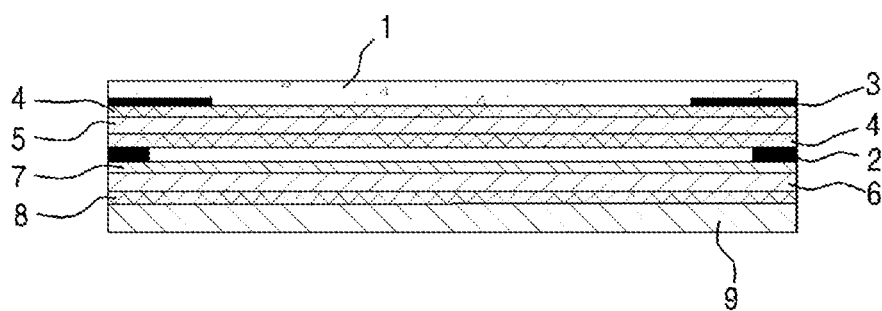
FIG. 1 is a longitudinal cross-sectional view illustrating the structure of a touch display unit of a capacitive overlay type according to conventional art.
Figure 2:
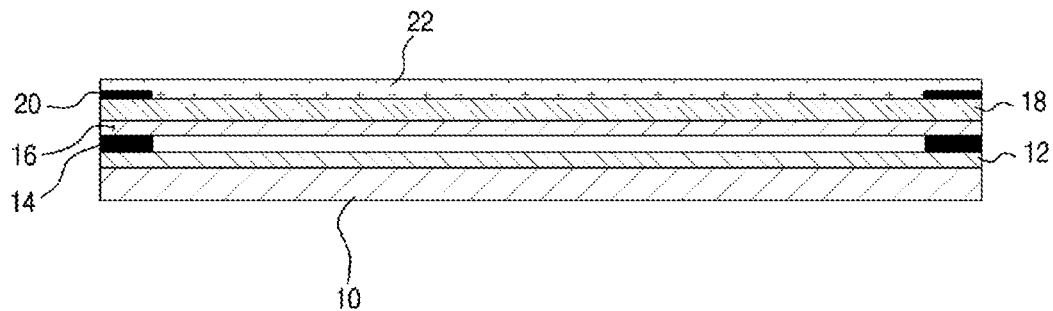
FIG. 2 is a longitudinal cross-sectional view illustrating the structure of a touch display unit disclosed in Korean Patent Laid-Open No. 10-2010-0065486.
Figure 3:
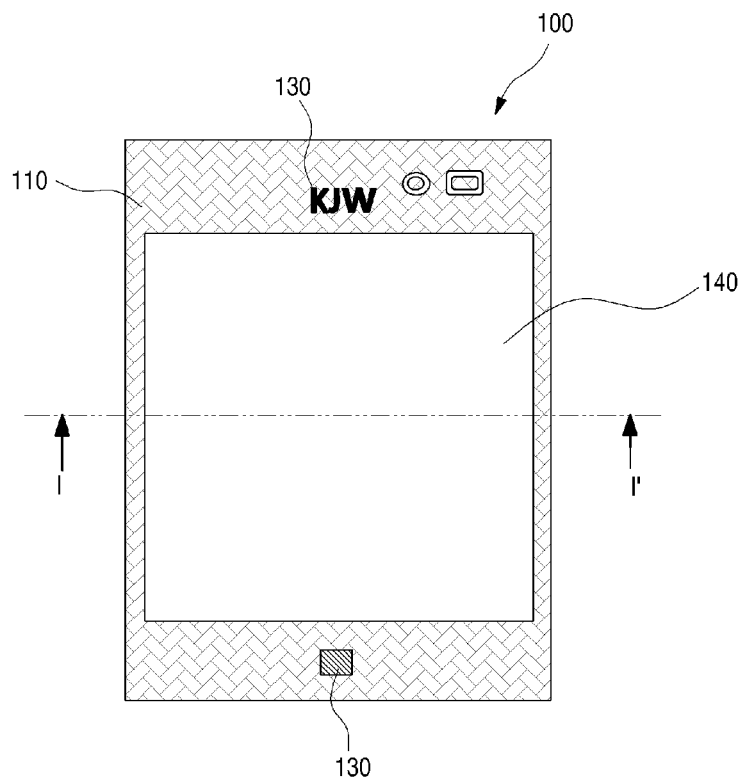
FIG. 3 is a plan view illustrating a constitution of the outer appearance of the touch screen display unit according to the present invention.

FIG. 3 is a plan view illustrating a constitution of the outer appearance of the touch screen display unit 100 according to the present invention. FIG. 4 is a longitudinal cross-sectional view taken along line I-I' of FIG. 3 illustrating a constitution of the inside of the touch screen display unit 100 according to the present invention.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Therefore, configurations described in embodiments and the accompanying drawings of the present invention do not represent all of the technical spirits of the present invention, but are merely most preferable embodiments. Therefore, the present invention should be construed as including all the changes, equivalents, and substitutions included in the spirit and scope of the present invention at the time of filing this application.

First, as can be seen in FIG. 3, the touch screen display unit 100 is provided at a rear side of the window 110 configuring the outer appearance of the touch screen of a capacitive overlay type, and includes a window 110 to complete the panel.

In general, the window 110 adopts intensified glass, and various materials may be used as far as they are transparent and have a predetermined strength.

Also, only an adhesive layer 120 and a decoration layer 130 are provided at the rear side of the window 110, thereby remarkably reducing the thickness of the display unit 100.

That is, in general, since the display unit has a thick and hard film included therein, it cannot be applied to a window that is thick and curved. However, the display unit 100 manufactured according to a preferable embodiment of the present invention includes only an adhesive layer 120 and a display layer 130 at the rear surface of the window 110 without having a film included. Thus, it has an effect of reducing the thickness and enhancing formability.

The adhesive layer 120 is removed of a protective film (see reference numeral 122 in FIG. 10), so that the surface exposed to have adhesiveness is attached on the window 110.

A decoration layer 130 is formed at the rear side of the adhesive layer 120, so as to display one or more among letters, designs, patterns, and a metallic texture having various colors.

That is, the adhesive layer 120 and window 110 are configured to be transparent, and the decoration is variously applied with UV pattern printing, vacuum deposition for metallic texture, color printing, etc., so as to allow the decoration layer to be seen therethrough from the outside of the window 110 and to perform the role of decoration.

The center portion of the touch screen display unit 100 is provided with a transparent display window 140.

The display window 140 maintains its transparency for not having processes such as color printing or depositing, etc. applied thereto in the decoration layer 130, so that the display unit 100 may be completely seen therethrough.

Also, the display window 140 is formed by drilling the part of the center of the adhesive layer 120 and decoration layer 130 simultaneously in an embodiment of the present invention. The adhesive layer 120 and decoration layer 130 are configured to have a closed-loop shape having the center portion drilled, and nothing exists in the center portion, thus forming a display window.

Figure 4:
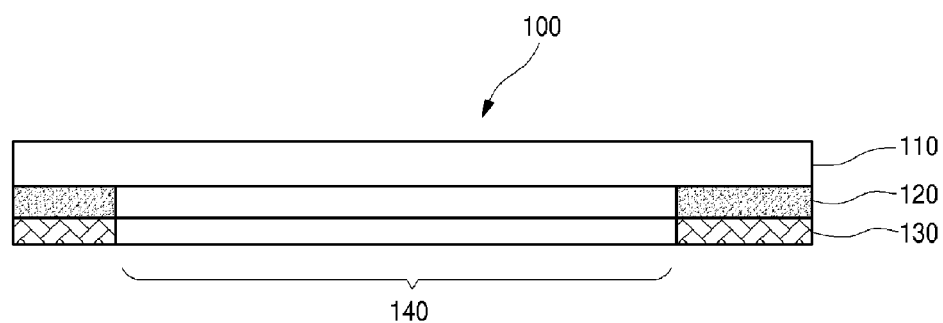
FIG. 4 is a longitudinal cross-sectional view taken along line I-I' of FIG. 3 illustrating a constitution of the inside of the touch screen display unit according to the present invention.

The display unit 100 configured as above gets thinner by having a simple laminated structure as shown in FIG. 4. Since the shape of the adhesive layer 120 and decoration layer 130 may vary, they may be attached evenly even if the window 110 is not even and is curved.

Hereinafter, referring to FIGS. 5 to 11, the method for manufacturing the display unit 100 is explained.

Figure 5:
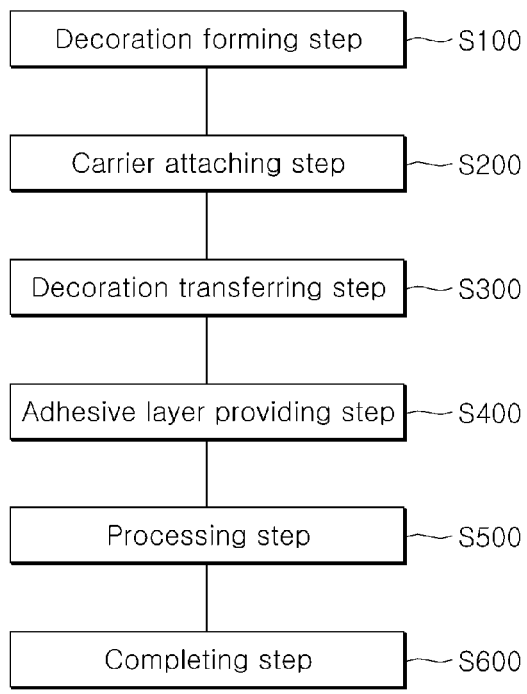
FIG. 5 is a process flow chart illustrating a method for manufacturing the touch screen display unit according to the present invention.

FIG. 5 is a process flow chart illustrating a method for manufacturing the touch screen display unit 100 according to the present invention.

As shown in the drawings, the display unit 100 is manufactured by carrying out a decoration forming step (S100) of forming a decoration layer 130 displaying, on a release layer 152 provided on a film 150, one or more among letters, designs, patterns and a metallic texture; a carrier attaching step (S200) of attaching a carrier 160 having adhesiveness on an outer surface of the decoration layer 130; a decoration transferring step (S300) of transferring the decoration layer 130 to be attached on a carrier 160 by separating the release layer 152 and the decoration layer 130; an adhesive layer providing step (S400) of adhering an adhesive layer 120 provided with a protective film 122 and the decoration layer 130; a processing step (S500) of processing the carrier 160, decoration layer 130, adhesive layer 120 and protective film 122 simultaneously; and a completing step (S600) of completing the touch screen display unit 100 by removing the protective film 122 to attach the adhesive layer 120 on the window 110 and removing the carrier 160, in order.

As a film 150 in the decoration forming step (S100), a release film with the release layer 152 is adopted, and a decoration layer 130 is formed on an outer surface of a release layer 152 provided on one surface of the film 150.

As mentioned above, the decoration layer 130 may display various letters, designs, patterns, metallic texture, etc., and it is obvious that various colors may be added.

Figure 6:
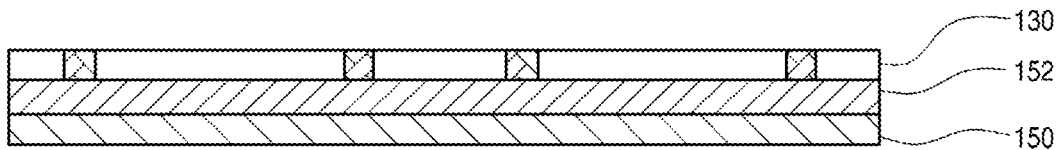
FIG. 6 is a longitudinal cross-sectional view illustrating a figure when the decoration forming step, which is a step in the method for manufacturing the touch screen display unit according to the present invention, is completed.

Thus, the decoration layer 130 may include a plurality of layers. When the decoration forming step (S100) is completed, the cross-sectional view is as shown in FIG. 6.

After the decoration layer 130 is formed, a carrier attaching step (S200) of attaching a carrier 160 on an outer surface of a decoration layer 130 is carried out. The carrier attaching step (S200) is a pre-step allowing a decoration layer 130 to be transferred to a carrier 160 later by adopting a material having adhesiveness.

Thus, the carrier 160 may be configured to have adhesiveness. In this regard, it may be configured to have adhesiveness only on one surface in contact with the decoration layer 130, and it is obvious that it may be configured to have adhesiveness only in the part in contact with the decoration layer 130.

Figure 7:
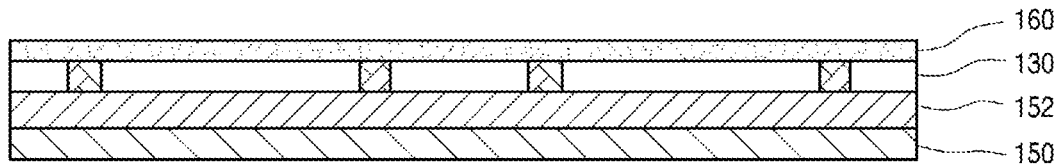
FIG. 7 is a longitudinal cross-sectional view illustrating a figure when the carrier attaching step, which is a step in the method for manufacturing the touch screen display unit according to the present invention, is completed.

FIG. 7 is a longitudinal cross-sectional view illustrating a figure when the carrier attaching step (S200), which is a step in the method for manufacturing the touch screen display unit 100 according to the present invention, is completed.

After the carrier attaching step (S200), a decoration transferring step (S300) of separating a release layer 152 and a film 150 from a decoration layer 130 is carried out. The decoration transferring step (S300) is a step of allowing a decoration layer 1300 formed in a release layer 152 to be transferred to a carrier 160. As mentioned above, this is possible because the carrier 160 has adhesiveness.

More preferably, the combining force of the release layer 152 and the decoration layer 130 is configured to be greater than the combining force of the carrier 160 and the decoration layer 130. When the decoration transferring step (S300) is completed, the cross-sectional view is as shown in FIG. 8.

Figure 8:
FIG. 8 is a longitudinal cross-sectional view illustrating a figure when the carrier transferring step, which is a step in the method for manufacturing the touch screen display unit according to the present invention, is completed.

FIG. 8 is a longitudinal cross-sectional view illustrating a figure when the carrier transferring step (S300), which is a step in the method for manufacturing the touch screen display unit 100 according to the present invention, is completed.

After the decoration transferring step (S300), an adhesive layer providing step (S400) is carried out. The adhesive layer providing step (S400) is a step of adhering an adhesive layer 120 provided with a protective film 122 on a decoration layer 130 where a release layer 152 is separated.

Figure 9:
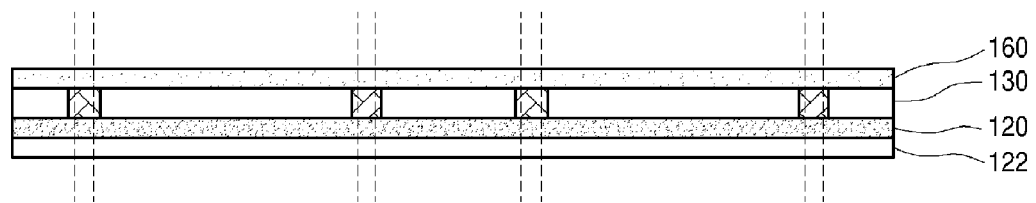
FIG. 9 is a longitudinal cross-sectional view illustrating a figure when the adhesive layer providing step, which is a step in the method for manufacturing the touch screen display unit according to the present invention, is completed.

FIG. 9 is a longitudinal cross-sectional view illustrating a figure when the adhesive layer providing step (S400), which is a step in the method for manufacturing the touch screen display unit 100 according to the present invention, is completed. An adhesive layer 120 is attached on the lower surface of the decoration layer 130 in the condition shown in FIG. 8, and a protective film 122 is provided at the lower surface of the adhesive layer 120.

After the adhesive layer providing step (S400), a processing step (S500) is carried out. The processing step (S500) is a step of processing a carrier 160, a decoration layer 130, an adhesive layer 120, and a protective layer 122 simultaneously.

For example, when a plurality of decoration layers 130 are formed on a release layer 152 during the decoration forming step (S100), cutting is carried out to split the layers individually through the processing step (S500), and drilling may be carried out, if necessary.

In this case, a display window 140 is formed at the center portion drilled as mentioned above.

Figure 10:
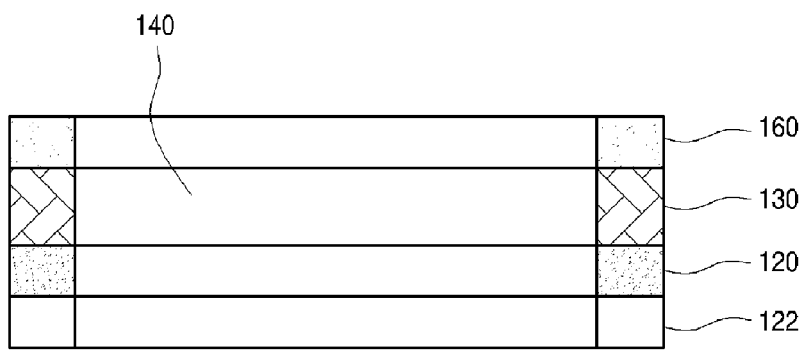
FIG. 10 is a longitudinal cross-sectional view illustrating a figure when the processing step, which is a step in the method for manufacturing the touch screen display unit according to the present invention, is completed.

FIG. 10 is a longitudinal cross-sectional view illustrating a figure when the processing step (S500), which is a step in the method for manufacturing the touch screen display unit 100 according to the present invention, is completed. When carrying out the processing step (S500) of cutting along the dotted line in FIG. 9, a plurality of cross-sectional structures may be achieved as shown in FIG. 10.

After the processing step (S500), a completing step (S600) is carried out.

Figure 11:
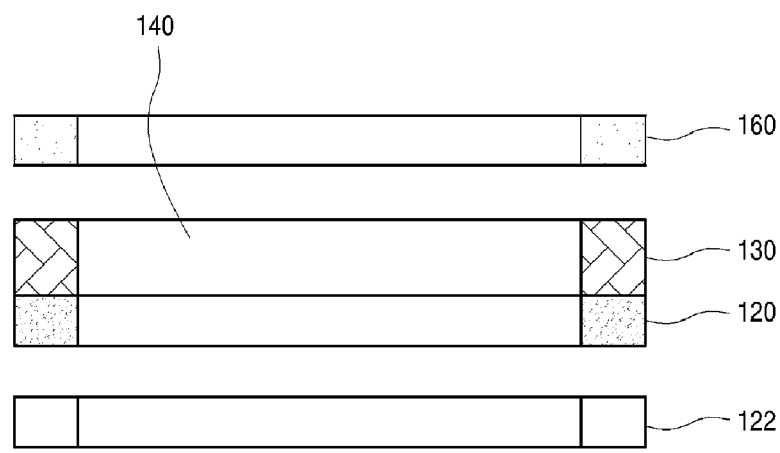
FIG. 11 is a longitudinal cross-sectional view illustrating a process of removing a protective film and a carrier during the completing step, which is a step in the method for manufacturing the touch screen display unit according to the present invention.

The completing step (S600) is a step of completing the display unit 100 by having a structure in the step of FIG. 10 gone through a process of FIG. 11.

That is, FIG. 11 is a longitudinal cross-sectional view illustrating a process of removing a protective film 122 and a carrier 160 during the completing step (S600), which is a step in the method for manufacturing the touch screen display unit 100 according to the present invention. After taking off a protective film 122 of an adhesive layer 120 and attaching the adhesive layer 120 on the window 110, the display unit 100 is completed by separating the carrier 160 attached on the decoration layer 130.

Figure 12:
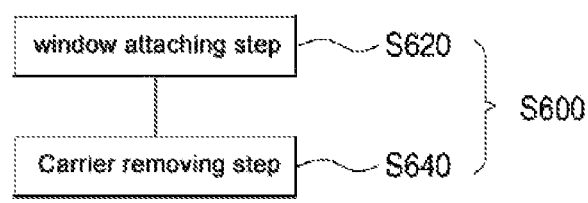
FIG. 12 is a process flow chart illustrating the completing step, which is a step in the method for manufacturing the touch screen display unit according to the present invention, in detail.

Thus, the completing step (S600) includes a plurality of steps as shown in FIG. 12.

FIG. 12 is a process flow chart illustrating the completing step, which is a step in the method for manufacturing the touch screen display unit according to the present invention, in detail. The completing step (S600) includes a window attaching step (S620) of attaching the adhesive layer 120 and window 110 by removing the protective film 122; and a carrier removing step (S640) of removing a carrier 160 from the decoration layer 130.

Preferably, the window attaching step (S620) and the carrier removing step (S640) are carried out in order.

That is, since the carrier 160 is in the form of a film having a predetermined strength, in case of removing the carrier 130 from the decoration layer 130 first, there is difficulty in carrying out the window attaching step (S620).

Thus, after allowing the adhesive layer 120, decoration layer 130, and carrier 160 to maintain its condition of being attached on the window 110 in order by carrying out the window attaching step (S620) without removing the carrier 160, when the carrier 160 is removed, the adhesive layer 120 and decoration layer 130 attached on the window 110 have deteriorated restoring force due to the removal of the carrier 160, and may maintain the condition of being firmly attached on the window 110.

By going through the above step, the manufacture of a display unit 100 is completed, and by including only a window 110, an adhesive layer 120, and a decoration layer 130 without including any film, the display unit may be implemented to be thin and may be attached even on a curved window 110.

As the adhesive layer 120, an optically clear adhesive (OCA) tape, which has adhesiveness on both surfaces and is transparent, is adopted.

The scope of the present invention is not limited to the embodiments described above and many other modifications based on the present invention may be achieved by those skilled in the art within the scope of the present invention.

For example, the present invention relates to a display unit 100, configured to include a display window 140. However, it is obvious that the display unit may include a decoration layer 130 all over one surface of the adhesive layer 120 without including a display window 140.

Also, the present invention may be configured so that the drilling for forming a display window 140 and excising for excising the outer perimeter are carried out simultaneously in the processing step (S500). However, to secure more precise accuracy in dimension, the drilling and excising may be carried out having a support layer (not shown) attached on the lower surface of the protective film 122 as shown in FIG. 9.

Also, it is obvious that the drilling and excising may be carried out in order.

INDUSTRIAL APPLICABILITY

The present invention includes a printable layer on one surface of the adhesive member having adhesive properties on both surfaces thereof, so as to allow the formation of a printing layer or deposition layer displaying letters, designs, patterns, metallic texture, etc. Accordingly, it became possible to mass produce an adhesive member with remarkably reduced manufacturing cost while making it thin by removing a PET film which was essential in conventional printing.

Since the present invention does not include a PET film, it may be attached even on a curved surface without limitation in the shape of the window made of intensified glass or PC. Thus, it may be widely applied to various products to which the touch screen display panel is applied.

What is claimed is:

1. A touch screen display unit, consisting essentially of:
   an adhesive layer having adhesive properties on both surfaces thereof;
   a decoration layer displaying, on one surface of the adhesive layer, one or more among letters, designs, patterns and a metallic texture; and
   a window attached directly on the other surface of the adhesive layer so as to allow the decoration layer to be seen therethrough and to form an outer appearance of the display unit.

2. The touch screen display unit of claim 1, wherein a part of the decoration layer and the adhesive layer are drilled to form a display window.

3. The touch screen display unit of claim 2, wherein the adhesive layer is transparent.

4. The touch screen display unit of claim 3, wherein the decoration layer comprises a plurality of layers.

5. A method for manufacturing a touch screen display unit, comprising:
   a decoration forming step of forming a decoration layer displaying, on a release layer provided on a film, one or more among letters, designs, patterns and a metallic texture;
   a carrier attaching step of attaching a carrier having adhesiveness on an outer surface of the decoration layer;
   a decoration transferring step of transferring the decoration layer to be attached on a carrier by separating the release layer and the decoration layer;
   an adhesive layer providing step of adhering an adhesive layer provided with a protective film and the decoration layer;

a processing step of processing the carrier, decoration layer, adhesive layer and protective film simultaneously;

a completing step of completing the touch screen display unit by removing the protective film to attach the adhesive layer on a window and removing the carrier, wherein the touch screen display unit consisting essentially of:

the adhesive layer having adhesive properties on both surfaces thereof;

the decoration layer displaying, on one surface of the adhesive layer, one or more among letters, designs, patterns and a metallic texture; and the window attached directly on the other surface of the adhesive layer so as to allow the decoration layer to be seen therethrough and to form an outer appearance of the display unit.

6. The method of claim 5, wherein the completing step comprises:

a window attaching step of attaching the adhesive layer and window by removing the protective film; and a carrier removing step of removing a carrier from the decoration layer.

7. The method of claim 6, wherein the adhesive layer has greater adhesiveness than the carrier.

8. The method of claim 7, wherein the carrier has adhesiveness only on a first surface.

9. The method of claim 8, wherein the decoration forming step is a process forming a plurality of decorations on one surface of the release layer.

10. The method of claim 5, wherein a display window is formed by drilling a part of the carrier, decoration layer, adhesive layer and protective film simultaneously during the processing step.

* * * * *